UNITED STATES PATENT OFFICE.

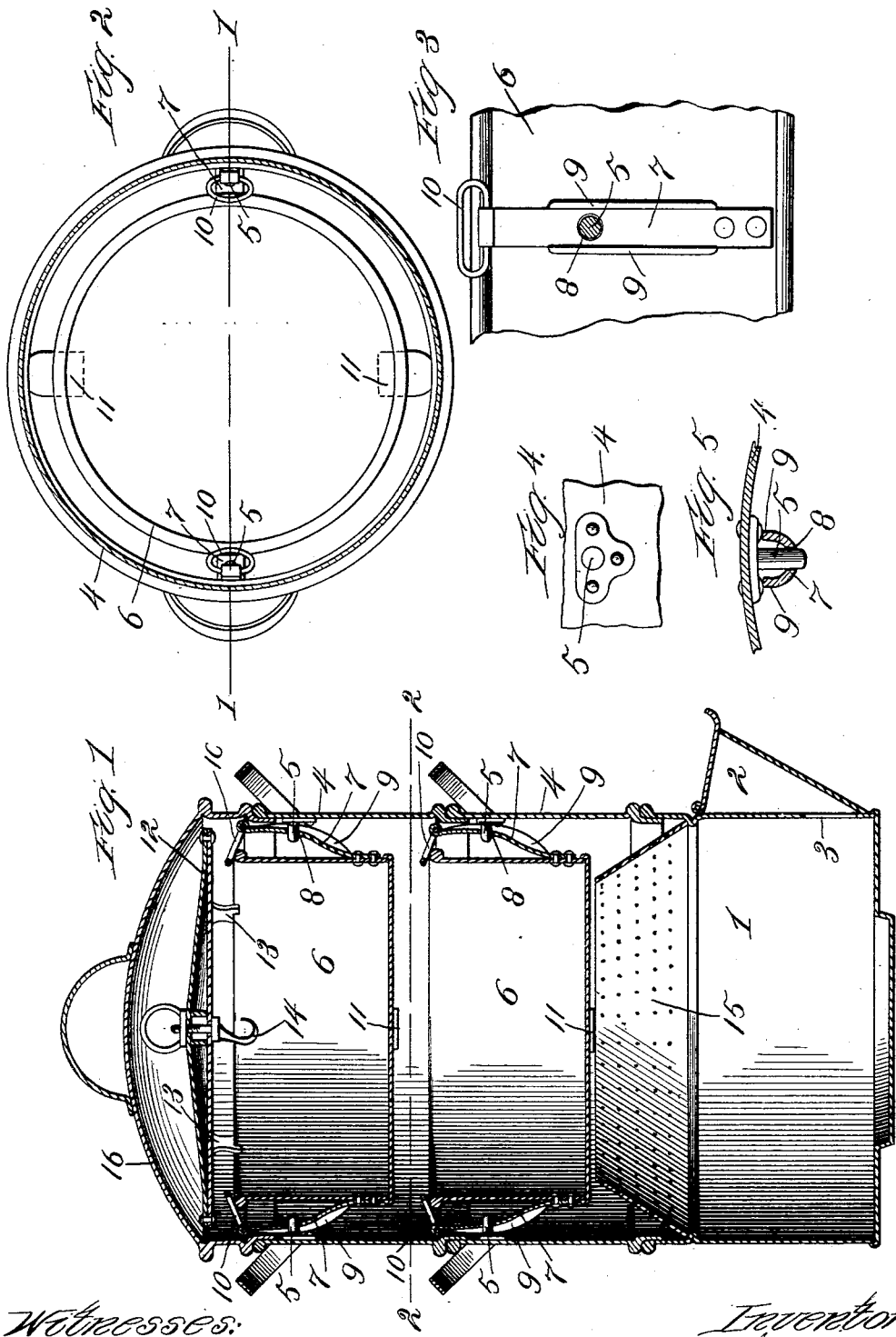

GEORGE A. SWARTWOUT, OF CHICAGO, ILLINOIS.

STEAM-COOKER.

SPECIFICATION forming part of Letters Patent No. 541,597, dated June 18, 1895.

Application filed November 29, 1893. Serial No. 492,406. (No model.)

*To all whom it may concern:*

Be it known that I, GEORGE A. SWARTWOUT, a citizen of the United States, residing at Chicago, in the county of Cook and State of Illinois, have invented certain new and useful Improvements in Steam-Cookers; and I do hereby declare the following to be a full, clear, and exact description of the invention, such as will enable others skilled in the art to which it appertains to make and use the same.

My invention relates to improvements in domestic steam cookers, of that class in which a series of cooking pans or food trays are supported within a chamber in which steam or vapor is generated.

The object of the invention is to provide a simply constructed and efficient steam cooker, and which is adapted to be operated in a convenient manner.

The invention consists in the novel features of construction and combination of parts hereinafter fully described and claimed, reference being had to the accompanying drawings, in which—

Figure 1 is a central vertical section of my improved steam-cooker, taken on the line 1 1 of Fig. 2. Fig. 2 is a transverse section taken on the line 2 2 of Fig. 1. Fig. 3 is an enlarged detached view of a portion of one of the cooking-pans, showing a face view of the locking spring-strap attached thereto. Fig. 4 is a detached front view of the locking stud-pin attached to a portion of a ring-section, and Fig. 5 is a top view of the same.

Referring to the drawings 1 designates the base vessel section of the boiler or steamer adapted for holding the water or liquid, and for the generation of the steam or vapor. Said base section is made of tin or other suitable material, and is preferably of cylindrical form. Said base section is provided with an external spout 2, which terminates in an opening 3 at the bottom thereof, and is adapted for filling and replenishing said base section with water or liquid as may be necessary during the operation of steaming or cooking.

4 are duplicate ring sections interchangeably fitted to the base section, and to each other, any desired number of which may be used to form the shell of the boiler, or steamer. Said ring sections are provided upon opposite sides with internal projecting lugs, or stud-pins 5, rigidly attached thereto. Said stud-pins are adapted for attaching the food trays or cooking pans 6, to said ring sections. Said cooking pans are provided with spring straps 7, the lower ends of which are riveted, or rigidly secured to the cooking pan. Said spring straps are provided near their upper or free ends with perforations 8, adapted for the insertion of said stud-pins, and are formed concave, or with outwardly projecting sides 9, between which the ends of the stud-pins upon the ring sections are held centered, as the cooking pan is pushed downward to its normal position, the straps being sprung and compressed inward thereby until the ends of the stud-pins are forced into the strap perforations by the resilience of the straps, the parts being then securely locked together. Said straps are provided at their upper ends with pivotally attached handles 10, by which they are operated, and by which the cooking pans are lifted when detached from the ring sections. Said cooking pans are provided with lugs 11 attached to the bottoms thereof intermediate the spring straps, or quartering therewith, and are to prevent the cooking pan from swinging or turning upon the stud-pins, and to hold it concentric with the ring sections when the two are turned together upon their sides to empty the food from the cooking-pan.

12 is an inner cover provided with downward projecting lugs 13, which are adapted to rest upon the top edge of the upper cooking pan, and to hold said cover at a height therefrom, equal to the height between the edges and bottoms of the cooking pans when a series are in use. Said cover is formed of two plates, the lower one of which is a level sheet, and the upper one is formed conical, the two sheets at their centers being held apart by means of a thimble through which a hook 14 is inserted upon which to hang a turkey, or other large article of food to be cooked, for which purpose the cooking pans are removed, and the said inner cover is then supported upon the stud-pins in the uppermost ring section. The outer diameter, or periphery of said inner cover is such that the edge extends nearly out to the inside of the ring section, sufficient space being left between them for the water of condensation to flow down from the top of the cover. Said outer edges of said cover plates are rigidly secured together. By this arrangement it will be seen that the said inner cover forms a bridge for the support of the weight upon the hook, and also that the condensation upon the top of the cover is prevented from cooling the steam between said cover and the adjacent cooking pan.

15 is an internal conical ring section, the lower edge of which rests upon a shoulder formed upon the inside of the base section of the boiler or steamer, and the upper edge of which is extended to nearly in contact with the bottom of the lowest cooking pan. Said conical ring is provided with perforations for the purpose of dividing the steam in its upward flow into the space surrounding the cooking pans and to prevent the water of saturation from being carried upward therewith.

16 is the boiler cover fitted to the ring sections and forming the top of the boiler shell. Said cover is provided with a handle, as is also the ring and base sections by which said parts are adapted to be lifted.

The joints of the ring sections and cover fitting thereto are carefully fitted, and as the necessary steam pressure is but slightly above that of the atmosphere condensation takes place at the joints by which undue leakage is, ordinarily, prevented. Where greater pressure is desirable the joints are provided with packing rings, and the parts securely locked together, and the boiler is then furnished with a relief or safety valve. The boiler may also be provided with a low water alarm signal or whistle, if such is desired.

From the foregoing description it will be seen that the boiler or steamer as constructed is one of great utility. Heretofore the cooking-pans have been loosely supported upon lugs or flanges formed upon the ring sections, or have been rigidly attached thereto, and also by supporting the pans upon perforated plates and upon one another, in which cases the cooking pans must be handled separately in removing the material therefrom, or the parts cannot be taken apart for the purpose of cleaning.

In my invention the cooking pans are detachably connected to the ring sections, so that the parts may be conveniently cleaned when separated, and when attached together are securely held to be operated by means of the handles upon the ring sections precisely the same as though the parts were rigidly connected together, the connecting and disconnecting of the parts being readily accomplished and in the most expeditious manner.

I have herein shown one practical mode of carrying out my invention, and which is preferred, but there are some modifications in the details of construction, which will readily appear to a skilled person, but which are not at variance with the spirit of my invention, such as the attachment of the spring strap to the ring sections instead of the cooking pans, and by attaching the spring strap circumferentially instead of longitudinally to the pans and by other means than a pin and perforation and I do not therefore desire to restrict or limit myself to the precise form or proportions and construction of the parts as shown.

Having thus described my invention, I claim—

In a steam-cooker the combination of a base vessel section, a series of ring sections interchangeably fitted to said base section and to each other, said ring sections provided upon their inner surfaces with projecting stud-pins rigidly attached thereto, a series of cooking pans supported upon said stud-pins and detachably connected thereto, and to said ring sections by means of spring-straps attached to said cooking pans, said spring straps provided with perforations adapted for the insertion of said stud-pins and to support said cooking pans thereon, and a cover fitted to said ring sections substantially as and for the purpose specified.

In testimony whereof I affix my signature in presence of two witnesses.

GEORGE A. SWARTWOUT.

Witnesses:
 A. ALBERTA BESSOR,
 HENRY B. OSGOOD.